United States Patent
Frazier et al.

(10) Patent No.: US 10,591,039 B2
(45) Date of Patent: Mar. 17, 2020

(54) FIBER REINFORCED PLENUM FOR LIMITED-SLIP DIFFERENTIAL

(71) Applicant: Eaton Intelligent Power Limited, Dublin (IE)

(72) Inventors: Daniel Stanley Frazier, Kalamazoo, MI (US); Javed Abdurrazzaq Mapkar, Commerce Township, MI (US); Kelly Ann Williams, South Lyon, MI (US)

(73) Assignee: Eaton Intelligent Power Limited, Dublin (IE)

( * ) Notice: Subject to any disclaimer, the term of this patent is extended or adjusted under 35 U.S.C. 154(b) by 72 days.

(21) Appl. No.: 15/518,881

(22) PCT Filed: Oct. 13, 2015

(86) PCT No.: PCT/US2015/055365
§ 371 (c)(1),
(2) Date: Apr. 13, 2017

(87) PCT Pub. No.: WO2016/061124
PCT Pub. Date: Apr. 21, 2016

(65) Prior Publication Data
US 2017/0241534 A1 Aug. 24, 2017

Related U.S. Application Data

(63) Continuation of application No. 29/530,633, filed on Jun. 18, 2015, now Pat. No. Des. 749,136, which is a
(Continued)

(51) Int. Cl.
*F16H 57/03* (2012.01)
*F16H 48/38* (2012.01)
(Continued)

(52) U.S. Cl.
CPC ......... *F16H 48/40* (2013.01); *B29C 45/0005* (2013.01); *B29C 45/0025* (2013.01);
(Continued)

(58) Field of Classification Search
CPC ... F16H 57/03; F16H 57/037; F16H 2048/382
See application file for complete search history.

(56) References Cited

U.S. PATENT DOCUMENTS 2,714,314 A    8/1955   Ulander
3,490,312 A    1/1970   Seitz et al.
(Continued)

FOREIGN PATENT DOCUMENTS

CN     202883932 U    4/2013
CN     103403098 B1    11/2013
(Continued)

OTHER PUBLICATIONS

International Search Report and Written Opinion of the International Searching Authority for corresponding International Patent Application No. PCT/US2015/055365 dated Jan. 7, 2016, 12 pgs.
(Continued)

*Primary Examiner* — Tisha D Lewis
(74) *Attorney, Agent, or Firm* — Merchant & Gould P.C.

(57) ABSTRACT

A net-shaped composite plenum housing body for a differential assembly having a pump is disclosed. The plenum housing body can include a low pressure inlet and a high pressure outlet configured to receive a control valve. The plenum housing body can also define a fluid inlet channel in fluid communication with the low pressure inlet via a first internal port and can be configured to be in fluid communication with an inlet side of the pump when the plenum housing body is assembled onto the differential assembly. The plenum housing body can also define a fluid outlet channel in fluid communication with the high pressure outlet
(Continued)

via a second internal port and can be configured to be in fluid communication with an outlet side of the pump when the plenum housing body is assembled onto the differential assembly. The plenum housing body can also be formed as a net-shape fiber reinforced plastic material including chopped fibers, for example, chopped fiberglass fibers, and an epoxy resin.

19 Claims, 11 Drawing Sheets

Related U.S. Application Data continuation of application No. 29/530,647, filed on Jun. 18, 2015, now Pat. No. Des. 750,138.

(60) Provisional application No. 62/153,136, filed on Apr. 27, 2015, provisional application No. 62/140,559, filed on Mar. 31, 2015, provisional application No. 62/063,367, filed on Oct. 13, 2014.

(51) Int. Cl.
| | | |
|---|---|---|
| *F16H 48/40* | (2012.01) | |
| *F16H 48/27* | (2012.01) | |
| *B29C 45/00* | (2006.01) | |
| *B29C 45/22* | (2006.01) | |
| *B29C 45/23* | (2006.01) | |
| *F16H 48/32* | (2012.01) | |
| *B29K 309/08* | (2006.01) | |
| *B29C 45/36* | (2006.01) | |
| *B29K 63/00* | (2006.01) | |
| *B29K 105/12* | (2006.01) | |
| *F16H 48/08* | (2006.01) | |
| *B29L 31/00* | (2006.01) | |

(52) U.S. Cl.
CPC ............ *B29C 45/22* (2013.01); *B29C 45/234* (2013.01); *F16H 48/27* (2013.01); *F16H 48/38* (2013.01); *B29C 2045/0027* (2013.01); *B29C 2045/363* (2013.01); *B29C 2045/366* (2013.01); *B29K 2063/00* (2013.01); *B29K 2105/12* (2013.01); *B29K 2309/08* (2013.01); *B29L 2031/7496* (2013.01); *F16H 48/08* (2013.01); *F16H 48/32* (2013.01); *F16H 2048/382* (2013.01)

(56) References Cited

U.S. PATENT DOCUMENTS

| | | |
|---|---|---|
| 4,012,968 A | 3/1977 | Kelbel |
| 4,214,507 A | 7/1980 | Hock et al. |
| 5,310,320 A | 5/1994 | Timuska |
| 5,310,388 A | 5/1994 | Okcuoglu et al. |
| 5,526,797 A | 6/1996 | Stokes |
| 6,059,680 A | 5/2000 | Yoshioka |
| 6,238,315 B1 | 5/2001 | Morse et al. |
| 6,332,522 B1 | 12/2001 | Morse et al. |
| 6,719,362 B1 | 4/2004 | Johnson et al. |
| 6,733,411 B1 | 5/2004 | Kaplan et al. |
| 6,789,657 B2 | 9/2004 | Schrand et al. |
| 6,814,399 B2 | 11/2004 | Johnson et al. |
| 6,918,851 B2 | 7/2005 | Ziech et al. |
| 7,063,198 B2 * | 6/2006 | Fratta .................. F16D 25/0638 |
| | | 192/103 F |
| 7,290,562 B2 | 11/2007 | Kane |
| 7,318,509 B2 | 1/2008 | Barlage |
| 7,341,136 B2 | 3/2008 | Park |
| 7,361,144 B2 | 4/2008 | Levrier et al. |
| 7,448,482 B2 | 11/2008 | Park |
| 7,749,124 B2 | 7/2010 | Nakajima |
| 8,043,184 B2 | 10/2011 | Boddy |
| 8,459,137 B1 | 6/2013 | McCoy et al. |
| 8,763,777 B2 | 7/2014 | Burns et al. |
| D735,758 S | 8/2015 | Williams et al. |
| 9,121,464 B2 | 9/2015 | Nichols et al. |
| D749,136 S | 2/2016 | Williams et al. |
| D750,138 S | 2/2016 | Williams et al. |
| 2005/0097984 A1 * | 5/2005 | Davis .................... F16H 57/033 |
| | | 74/606 R |
| 2005/0252746 A1 | 11/2005 | Morgensai et al. |
| 2005/0261101 A1 | 11/2005 | Yoshioka |
| 2006/0076209 A1 | 4/2006 | Fratta et al. |
| 2007/0045078 A1 | 3/2007 | Park |
| 2007/0077379 A1 | 4/2007 | Passera et al. |
| 2007/0289442 A1 | 12/2007 | Waller et al. |
| 2008/0023918 A1 | 1/2008 | Strasser et al. |
| 2009/0193966 A1 | 8/2009 | Phlegm et al. |
| 2009/0215575 A1 | 8/2009 | Schrand et al. |
| 2013/0239932 A1 | 9/2013 | Jessberger et al. |
| 2013/0331500 A1 | 12/2013 | Yokoe et al. |
| 2014/0011619 A1 | 1/2014 | Pohl et al. |
| 2014/0099226 A1 | 4/2014 | Eybergen et al. |
| 2015/0111684 A1 | 4/2015 | Fox |
| 2016/0003344 A1 * | 1/2016 | Mapkar ................. F16H 57/037 |
| | | 428/35.8 |
| 2016/0312794 A1 * | 10/2016 | Boehm .................. F04D 1/063 |

FOREIGN PATENT DOCUMENTS

| | | |
|---|---|---|
| EP | 1 945 972 | 7/2008 |
| JP | H05-256364 A | 10/1993 |
| JP | H05-272639 A | 10/1996 |
| JP | 2007-239972 A | 9/2007 |
| WO | 83/01284 A1 | 4/1983 |
| WO | 2007/047224 A1 | 4/2007 |
| WO | 2008/025133 A1 | 3/2008 |
| WO | 2010/113018 A1 | 10/2010 |
| WO | 2011/023747 A1 | 3/2011 |
| WO | 2013/155138 A1 | 10/2013 |

OTHER PUBLICATIONS

Extended European Search Report for Application No. 15851381.2 dated Apr. 20, 2018.

* cited by examiner

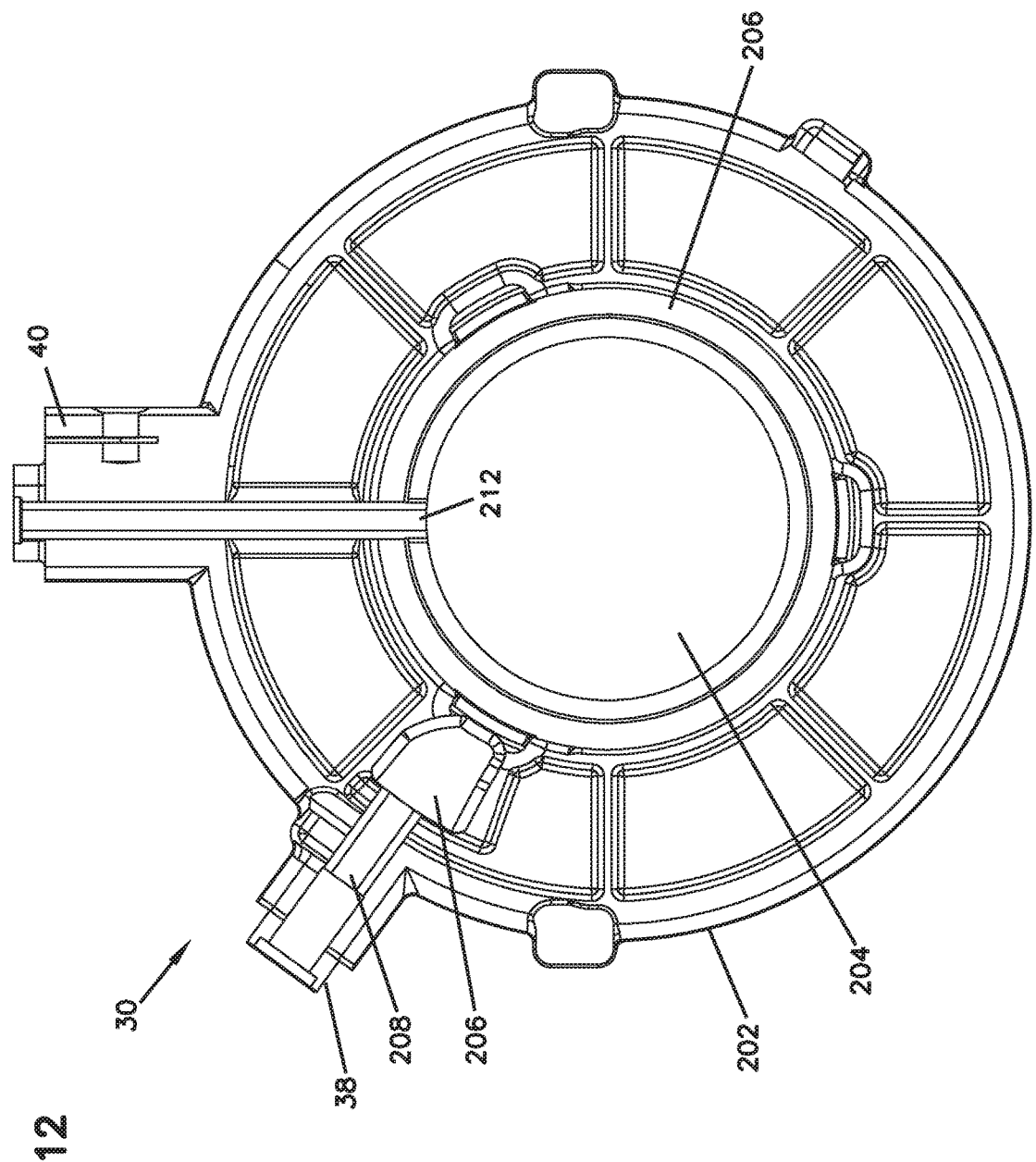

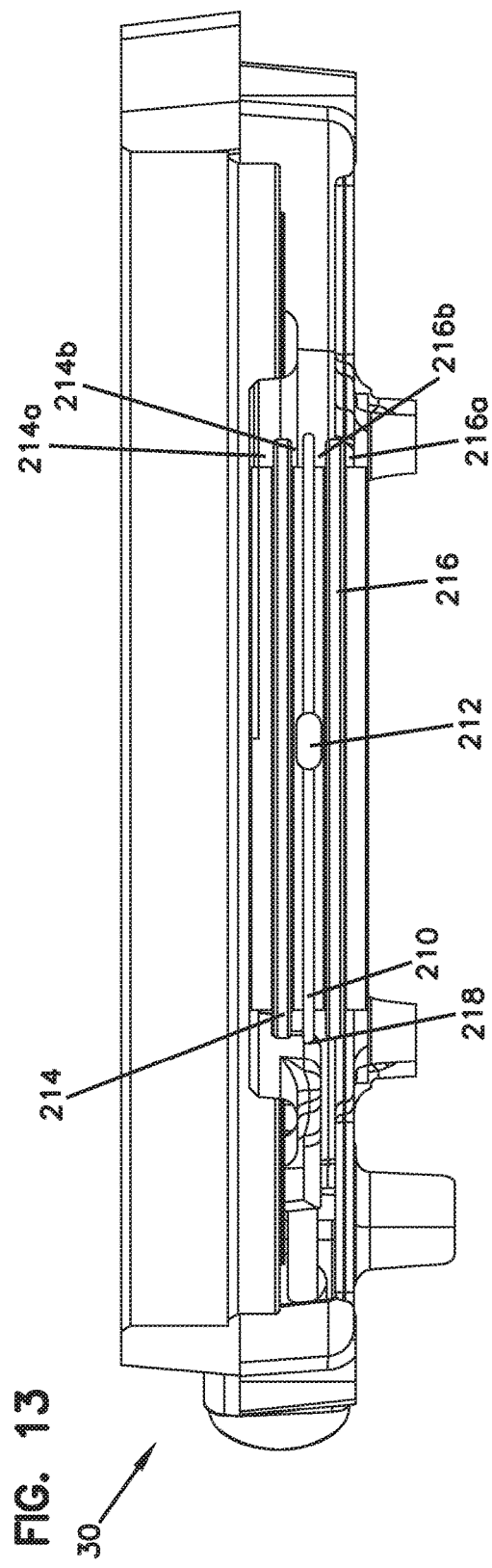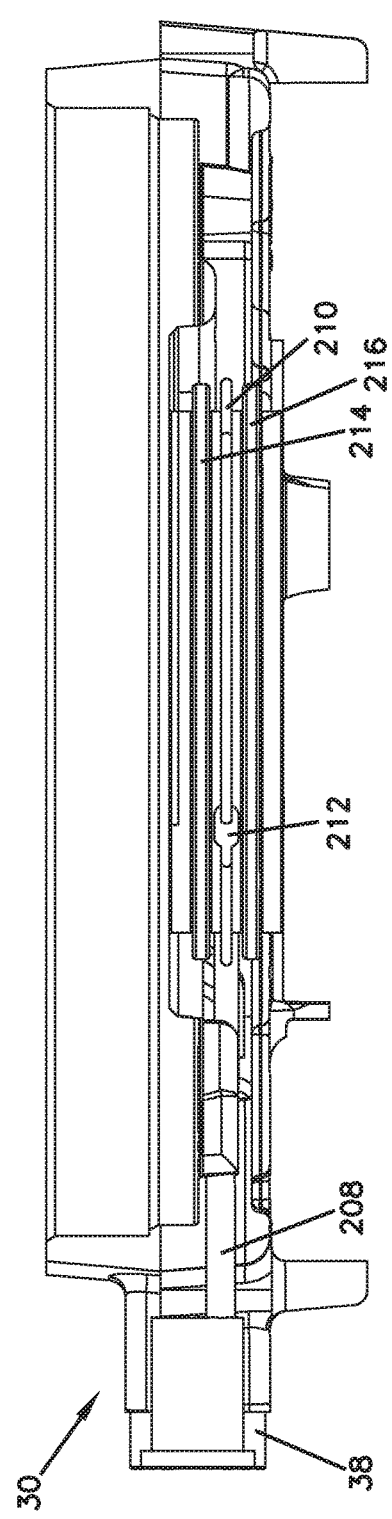

FIBER REINFORCED PLENUM FOR LIMITED-SLIP DIFFERENTIAL

CROSS-REFERENCE TO RELATED APPLICATIONS

This application is a National Stage Application of PCT/US2015/055365, filed on 13 Oct. 2015 and claims priority to U.S. Patent Application Ser. No. 62/063,367 filed on 13 Oct. 2014, U.S. Patent Application Ser. No. 62/140,559 filed on 31 Mar. 2015, U.S. Patent Application Ser. No. 62/153,136 filed on 27 Apr. 2015, U.S. patent application Ser. No. 29/530,633 filed on 18 Jun. 2015, and U.S. patent application Ser. No. 29/530,647 filed on 18 Jun. 2015, the disclosures of which are incorporated herein by reference in their entireties. To the extent appropriate, a claim of priority is made to each of the above disclosed applications.

TECHNICAL FIELD

The present disclosure relates generally to limited-slip differential assemblies. More particularly, the present disclosure relates to an improved plenum for use in a limited-slip differential assembly.

BACKGROUND

Limited-slip differentials have been developed that use a hydraulically actuated clutch to limit differential rotation between the output shafts of the differential. Such limited-slip differentials can include a pump in the form of a gerotor incorporated into the differential housing. Solenoid valves have been used to precisely control the actuation pressure provided to the clutch. However, to be operable, such valves require an electronic controller and valve control hardware/software. Example limited-slip differentials are disclosed at U.S. Pat. Nos. 4,012,968; 5,310,388; 6,332,522; 6,733,411; 6,789,657; 7,361,144; 7,448,482; and 8,043,184.

A plenum housing is a common metal (e.g. aluminum) component provided on differential assemblies. A plenum housing typically features a low pressure in-feed and a high pressure control. Such plenums generally supply low pressure fluid (under vacuum) to an integrated pump in the differential and feature a high pressure passageway from the pressurized actuator cavity in the differential. The plenum can also retain a valve which regulates the pressure of the differential system.

SUMMARY

Vehicle emissions can be reduced through the development and usage of new materials and processes not traditionally used in the automotive industry besides exclusive applications. Metal replacement with lighter weight components and design optimization can have a doubly rewarding effect; namely, a lighter vehicle system not only requires less road load power for motivation, but also allows for smaller, usually more efficient powertrain options, which tend to be more efficient still. This can be accomplished, in part, by adapting composite materials that have typically been available only to the upper end of the market and specialty racing applications. The specific component detailed in the teachings herein highlight the challenges and rewards for metal replacement with an injection molded, fiber reinforced plastic for usage in mass produced drivetrain systems, namely in an electronic limited slip differential (eLSD).

In one aspect, the component detailed herein is a mechanical plenum that serves as a hydraulic supply, a fluid pressure control and a structural body for an eLSD system. Not only does the design approach for the component qualify for weight savings through material comparison, but its processing also allows for sub-component integration, further reducing final assembly complexity and lowering production cost. Material and production tooling costs are also favorable due to the net-shape processing allowed via injection molding.

The injection molded design replaces a previously permanent molded aluminum with an injection molded, short glass fiber reinforced polymer. This disclosure describes the challenges and advantages of design and processing that have allowed the plenum to be optimized for the light-weighting of the eLSD system. A general design approach encompassing the myriad activities necessary for a transition from metal to plastic is also discussed that highlights the lessons learned during the process of readying the component for the transition from research and development prototype into production acceptance.

In one aspect of the teachings presented herein, a plenum housing body for a differential assembly having a pump is disclosed. The plenum housing body can include a low pressure inlet and a high pressure outlet configured to receive a control valve. The plenum housing body can also define a fluid inlet channel in fluid communication with the low pressure inlet via a first internal port and can be configured to be in fluid communication with an inlet side of the pump when the plenum housing body is assembled onto the differential assembly. The plenum housing body can also define a fluid outlet channel in fluid communication with the high pressure outlet via a second internal port and can be configured to be in fluid communication with an outlet side of the pump when the plenum housing body is assembled onto the differential assembly. The plenum housing body can also be formed as a net-shape fiber reinforced plastic material including chopped fibers, for example, chopped fiberglass fibers, and an epoxy resin.

A method for making a plenum housing body for a differential assembly having a pump is also disclosed. The method can include the steps of providing a mold cavity defining a central aperture of the plenum housing body and an outer perimeter of the plenum housing body and injecting a fiber reinforced plastic material including chopped fibers and an epoxy resin into the mold cavity through a plurality of gates. The method can also include injecting the fiber reinforced plastic material through a plurality of gates that are located closer in proximity to the outer perimeter than to the central aperture. The fiber reinforced plastic material can include chopped fiberglass fibers.

The plenum's main loading and stress comes from pressurized axle gear oil that is the hydraulic system's working fluid. The plenum has high pressure passageways and a central ID groove that commutes fluid from the differential to the control valve. The ID high pressure groove is opposed by two dynamic, high pressure seals. Other parts of the assembly include a low pressure, dynamic lip seal and filter as well as a bushing. The plenum is a stationary component while being an assembled piece on the rotating differential; therefore, it has integrated anti-rotation features.

A variety of additional aspects will be set forth in the description that follows. These aspects can relate to individual features and to combinations of features. It is to be understood that both the foregoing general description and the following detailed description are exemplary and

BRIEF DESCRIPTION OF THE DRAWINGS

FIG. 12 is a cross-sectional view of the plenum housing body shown in FIG. 5 taken along the line 12-12 in FIG. 9.

FIG. 13 is a cross-sectional view of the plenum housing body shown in FIG. 5 taken along the line 13-13 in FIG. 9.

FIG. 14 is a cross-sectional view of the plenum housing body shown in FIG. 5 taken along the line 14-14 in FIG. 9.

DETAILED DESCRIPTION

Reference will now be made in detail to exemplary aspects of the present disclosure that are illustrated in the accompanying drawings. Wherever possible, the same reference numbers will be used throughout the drawings to refer to the same or like structures.

Differential Assembly General Description

As disclosed herein in FIGS. 1-4, a limited-slip driveline apparatus in accordance with the principles of the present teachings has been incorporated into a differential assembly. It will be appreciated that while the limited-slip driveline apparatus has specifically been shown incorporated into a differential, the various aspects of the present disclosure are applicable to any type of driveline apparatus having a clutch for controlling relative rotation between two driveline components. As used herein, the term "clutch" means any structure that uses friction to control relative rotation between two components. A differential of the type disclosed herein is further described and shown in PCT International Publication Number WO 2013/155138, the entirety of which is incorporated by reference herein.

Figure 1:
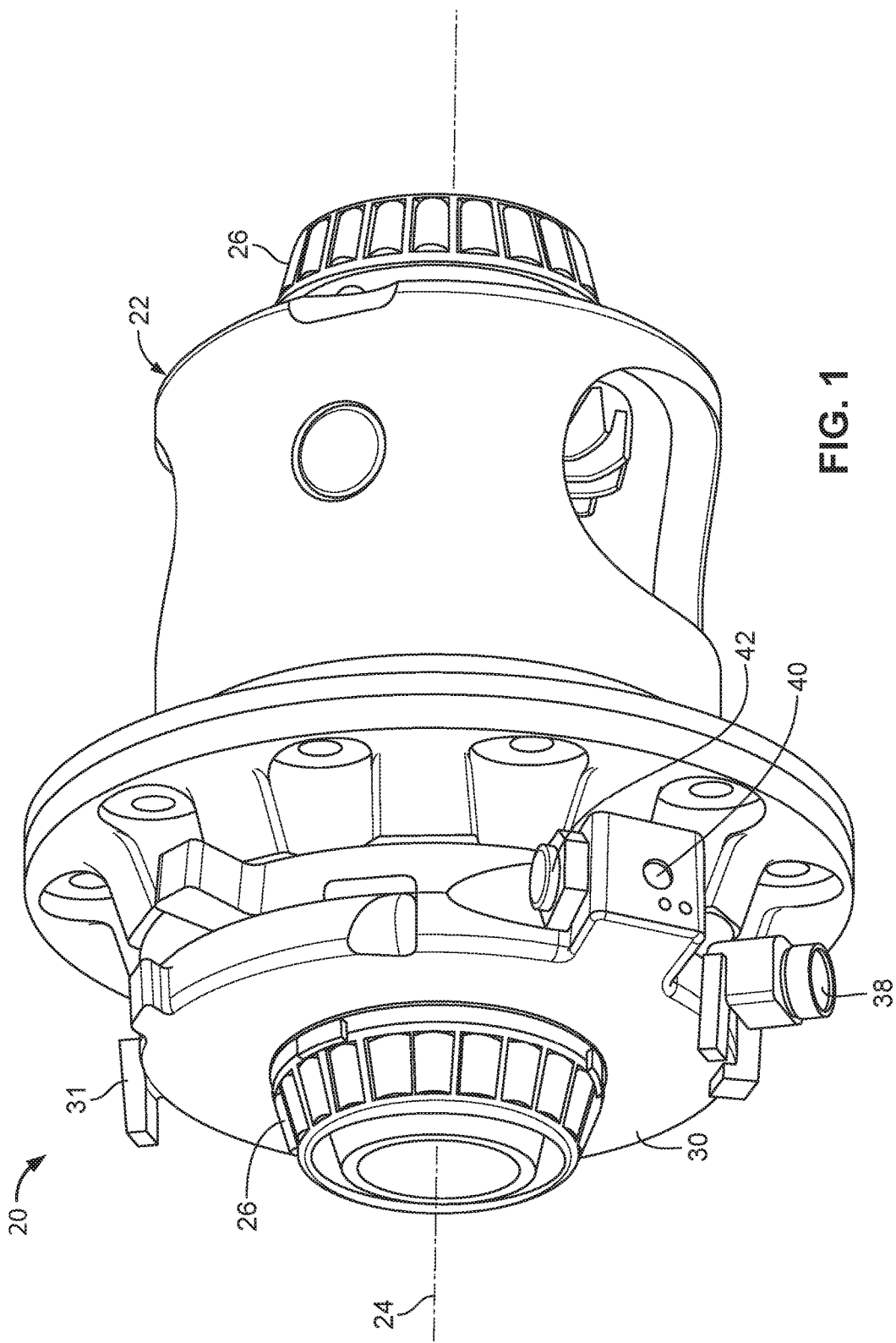
FIG. 1 is a perspective view of a differential incorporating a limited-slip driveline apparatus in accordance with the principles of the present disclosure.

FIG. 1 illustrates a differential 20 incorporating a limited-slip driveline apparatus in accordance with the principles of the present disclosure. The differential 20 includes a differential housing 22 that in use is rotated about a rotation axis 24. Bearings 26 are provided at opposite ends of the differential housing 22. The bearings 26 are co-axially aligned along the rotation axis 24 and are configured for rotatably mounting the differential housing 22 within an outer housing 28 (e.g., a differential carrier as shown schematically in FIG. 2). The outer housing 28 contains a hydraulic fluid such as oil that can be used for lubricating various components (e.g. gears) within the outer housing 28 and the differential housing 22.

A plenum housing 30, discussed in greater detail in the following section, is mounted at one end of the differential housing 22. The differential housing 22 is rotatable relative to the plenum housing 30 about the rotation axis 24. The plenum housing 30 includes tabs 31 that engages the outer housing 28 to prevent relative rotation between the plenum housing 30 and the outer housing 28. A hydraulic fluid pump 32 (see FIGS. 2 and 3) is provided within the differential housing 22. The hydraulic fluid pump 32 is part of a hydraulic actuation circuit 34 that extends through the plenum housing 30 and the differential housing 22. The volume of oil within the outer housing 28 forms a reservoir 36 of the hydraulic circuit 34. The hydraulic fluid pump 32 draws oil from the reservoir 36 through an input port 38 defined by the plenum housing 30 and outputs oil back to the reservoir 36 through an output port 40 defined by the plenum housing 30. A flow regulating valve 42 regulates a hydraulic fluid flow rate through the hydraulic circuit 34. In one embodiment, the flow regulating valve 42 prevents the hydraulic fluid flow rate within the hydraulic actuation circuit 34 from exceeding a set maximum flow rate regardless of a magnitude of the fluid pressure generated by the hydraulic fluid pump 32 within the hydraulic circuit 34.

Figure 2:
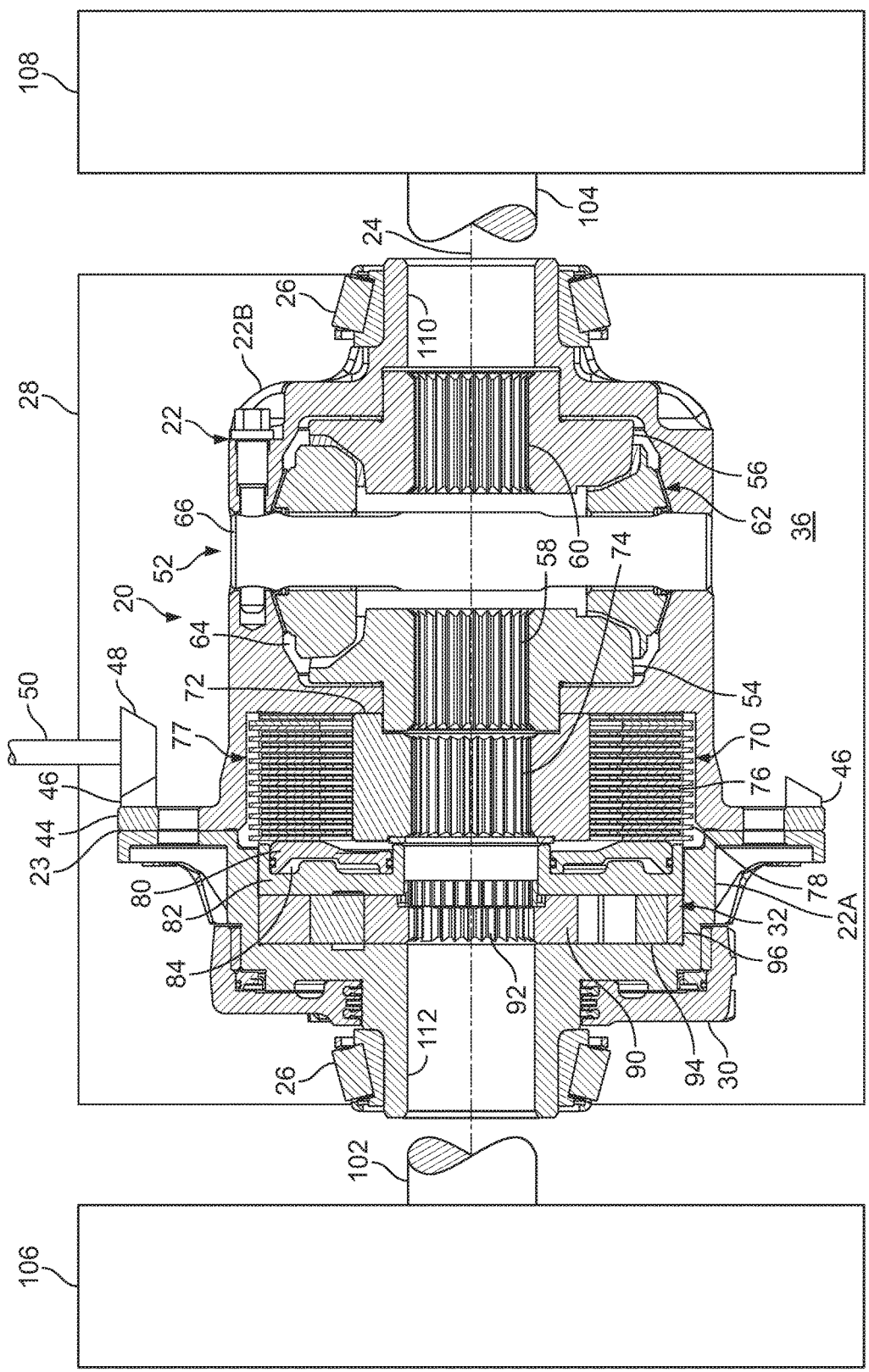
FIG. 2 is a cross-sectional view cut longitudinally through the differential of FIG. 2.
Figure 3:
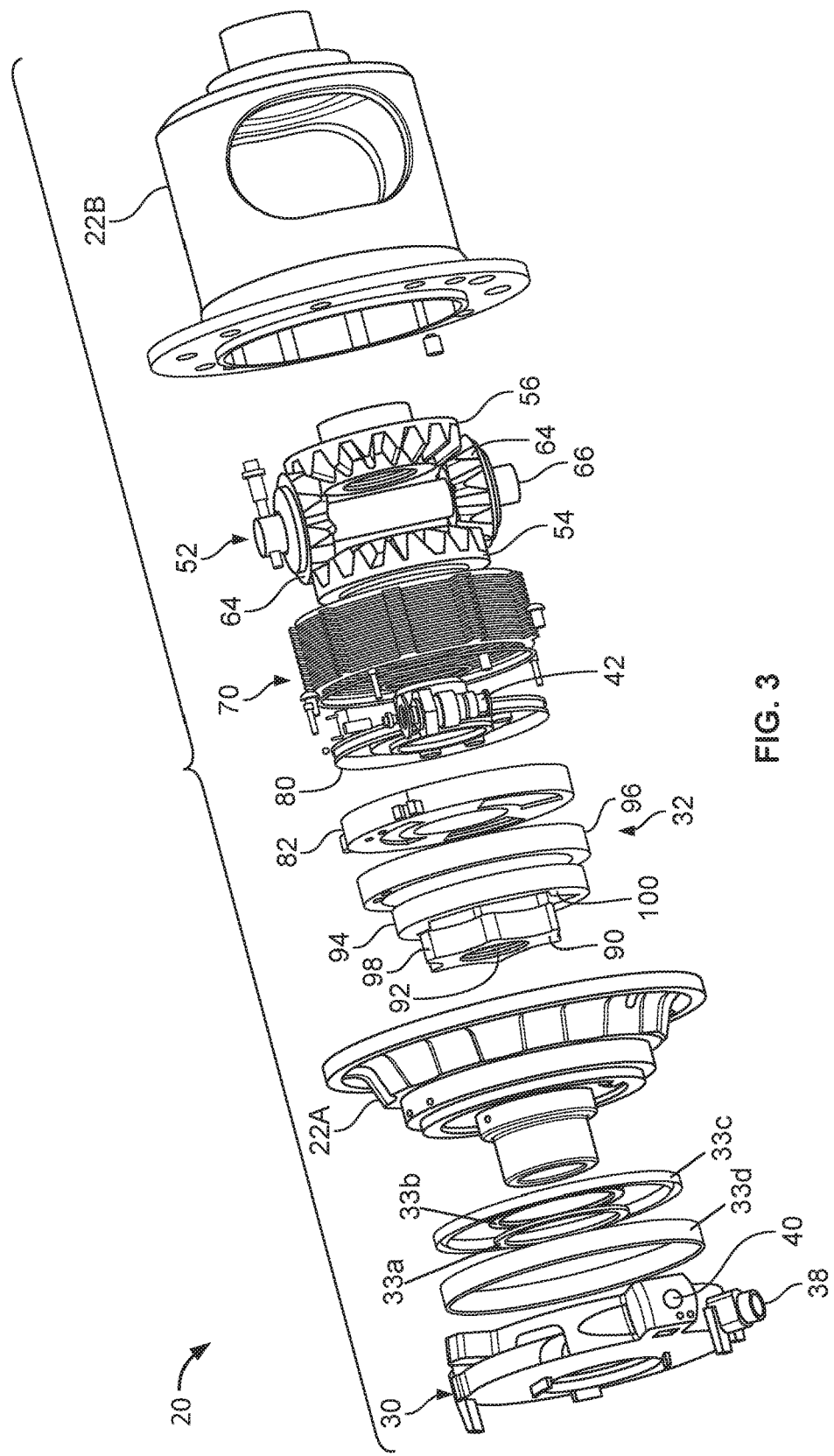
FIG. 3 is an exploded, perspective view of the differential of FIG. 1.

Referring to FIGS. 2 and 3, it can be seen that the differential housing 22 includes a first housing piece 22A and a second housing piece 22B that meet at an interface 23. The housing pieces 22A, 22B can be secured together by fasteners, welding or other techniques. The differential housing 22 defines a flange 44 adjacent the interface 23 for mounting a ring gear 46. In use of the differential 20, the ring gear 46 intermeshes with a bevel gear 48 driven by a driveshaft 50. As the bevel gear 48 is rotated by the driveshaft 50, the bevel gear 48 engages the ring gear 46 thereby causing rotation of the differential housing 22 about the rotation axis 24. The plenum housing body 30 can be sealed against the first housing piece 22A with seal members 33a, 33b, 33c, and 33d.

Referring still to FIG. 2, the differential 20 includes a torque transfer arrangement 52 mounted within the second housing piece 22B. The torque transfer arrangement 52 includes first and second side gears 54, 56 (e.g., sun gears) that respectively define output shaft openings 58, 60 that are coaxially aligned along the rotation axis 24. The torque transfer arrangement 52 also includes a planetary gear set 62 mounted between the first and second side gears 54, 56. The planetary gear set 62 is configured for transferring torque between the differential housing 22 and the first and second side gears 54, 56 while concurrently permitting the first and second side gears 54, 56 to rotate relative to one another (e.g., at different rotational speeds) about the rotation axis 24. The planetary gear set 62 includes pinion gears 64 rotatably mounted on a shaft 66 fixed relative to the differential housing 22. Each of the pinion gears 64 intermeshes with both the first side gear 54 and the second side gear 56.

The differential 20 also includes a clutch 70 mounted within the second housing piece 22B. The clutch 70 includes a coupler 72 defining an output shaft opening 74 coaxially aligned with the rotation axis 24. The coupler 72 carries a plurality of a friction plates 76 that project radially outwardly from the main body of the coupler 72. The friction plates 76 are rotationally fixed relative to the main body of the coupler 72. The clutch 70 also includes a plurality of eared discs 78 that are carried by the differential housing 22. The discs 78 are rotationally fixed relative to the differential housing 22. The eared discs 78 are interleaved between the friction plates 76 to form a clutch pack 77. The clutch 70 is configured to resist relative rotation between the coupler 72 and the differential housing 22 at least when the clutch is actuated. When the clutch 70 is actuated, the friction plates 76 are preferably compressed against the eared discs 78 so that friction resists relative rotation between the friction plates 76 and the eared discs 78.

The differential 20 further includes an actuation arrangement for actuating the clutch 70 by compressing the clutch pack 77. The actuation arrangement includes a piston 80 mounted within a piston housing 82. The piston 80 of the present teachings includes ornamental features beyond the technical and functional features disclosed herein. For example, U.S. patent application Ser. No. 29/530,647 discloses a design for a composite piston. The entirety of U.S. Ser. No. 29/530,647 is incorporated by reference herein.

A pressure chamber 84 is defined between the piston 80 and the piston housing 82. The piston 80 is moveable relative to the piston housing 82 along the rotation axis 24. The actuation arrangement also includes the hydraulic fluid pump 32. When the hydraulic fluid pump 32 pumps hydraulic fluid through the hydraulic actuation circuit 34, the pressure chamber 34 is pressurized thereby causing the piston 80 to slide along the rotation axis 24 toward the clutch pack 77. As the piston 80 is forced against the clutch pack 77 by hydraulic pressure within the pressure chamber 84, the friction plates 76 and the eared discs 78 are compressed together such that the clutch 70 is actuated. Meaningful braking/actuation of the clutch 70 does not take place until the hydraulic pressure in the pressure chamber 84 reaches a predetermined level.

The hydraulic fluid pump 32 of the differential 20 is depicted as a gerotor pump. The hydraulic fluid pump 32 includes an inner gear 90 having an output shaft opening 92 that is coaxially aligned with the rotation axis 24. The hydraulic fluid pump 32 also includes an outer gear 94 positioned outside the inner gear 90. The outer gear 94 is positioned within an eccentric sleeve 96. The eccentric sleeve 96 is coupled to the differential housing 22 so that the eccentric sleeve 96 is carried by the differential housing 22 as the differential housing 22 rotates about the rotation axis 24. In this way, the eccentric sleeve 96 is configured to rotate in concert with the differential housing 22. The inner and outer gears 90, 94 are free to move within the eccentric sleeve 96. As shown at FIG. 3, the inner gear 90 includes outer teeth 98 that engage inner teeth 100 of the outer gear 94. The inner teeth 100 of the outer gear 94 include one more tooth than the outer teeth 98 of the inner gear 90. When relative rotation is generated between the eccentric sleeve 96 and the inner gear 90, the teeth of the inner and outer gears 90, 94 cooperate to define a series of pockets having increasing and decreasing volumes which creates a pumping action. In this way, the inner and outer gears 90, 94 generate hydraulic fluid flow and corresponding hydraulic fluid pressure used for actuating the clutch 70. While gerotor pumps are preferred for the present application, it will be appreciated that other types of hydraulic pumps could be used as well.

In use of the differential 22, first and second output shafts 102, 104 (see FIG. 2) are preferably coupled to the differential 20. The first and second output shafts 102, 104 are shown coupled to respective first and second wheels 106, 108. The second output shaft 104 is rotatably received within an output shaft opening 110 defined by the second housing piece 22B of the differential housing 22. The second output shaft 104 is also rotationally fixed within the output shaft opening 60 of the second side gear 56 by means such as splines. The first output shaft 102 is rotatably received within an output shaft opening 112 defined by the first housing piece 22A. The first output shaft 102 is also rotationally fixed within the output shaft opening 92 defined by the inner gear 90 of the gerotor pump, the output shaft opening 74 defined by the coupler 72 of the clutch 70, and the output shaft opening 58 defined by the first side gear 54. It will be appreciated that splined connections can be used to provide the fixed rotational connection between the first output shaft 102 and the inner gear 90, the coupler 72 and the first side gear 54. In this way, the first side gear 54, the coupler 72, and the inner gear 90 all rotate in concert (i.e., unison) with the first output shaft 102 as the first output shaft 102 is rotated about the rotation axis 24. Because of this relationship, when the clutch 70 is actuated, the clutch functions to control the relative rotational speed between the entire assembly (i.e., the first output shaft 102, the inner gear 90, the coupler 72 and the first side gear 54) and the differential housing 22.

In view of the above, it will be appreciated the hydraulic pump 32 is coupled between the differential housing 22 and the first output shaft 102 so that relative rotation between the first output shaft 102 and the differential housing 22 causes the pump 32 to pump hydraulic fluid through the hydraulic actuation circuit 34. For example, the eccentric sleeve 96 is non-rotationally coupled to the differential housing 22 and the inner gear 90 is non-rotationally coupled to the first output shaft 102. Because the hydraulic pump 32 is coupled between the differential housing 22 and the first output shaft 102, the speed of the hydraulic pump and thus the flow rate generated by the pump is directly dependent on the relative rotational speed between the differential housing 22 and the first output shaft 102. In one example, the pump displaces a fixed volume of hydraulic fluid at a given relative rotational speed.

It will be appreciated that the limited-slip clutch apparatus is configured to allow a limited amount of relative rotation between the differential housing 22 and the first output shaft 102 while preventing the relative rotation from exceeding a predetermined rate. In one embodiment, the predetermined maximum amount of relative rotation permitted is about 60 rotations per minute. This rate of relative rotation is suitable for allowing the wheels 106, 108 to rotate at different speeds for accommodating turning/cornering. Relative rotational speeds greater than the predetermined maximum rate of relative rotation would indicate that one of the wheels 106, 108 is slipping (e.g., on ice or other slippery medium) and spinning at a high speed and the other of the wheels 106, 108 has stopped or significantly slowed due to lack of torque. In the case where the second wheel 108 slips and the first wheel 106 stops, the eccentric sleeve 96 coupled to the rotating differential housing 22 will drive the outer gear 94 about the inner gear 90 such that the hydraulic pump 32 pumps fluid through the actuation circuit 34 to actuate the clutch 70. In this situation, actuation of the clutch 70 causes increased torque to be transferred from the differential housing 22 to the first output shaft 102 thereby causing rotation of the first output shaft 102 and the first wheel 106. In the case where the first wheel 106 slips and the second wheel 108 stops, the inner gear 90 coupled to the first output shaft 102 (which is rotating faster than the differential housing 22) will drive the inner gear 90 relative to the outer gear 94 such that the hydraulic pump 32 pumps fluid through the actuation circuit 34 to actuate the clutch 70. In this situation, actuation of the clutch 70 brakes/resists rotation of the first output shaft 102 relative to the differential housing 22 causing increased torque to be transferred through the differential housing 22 and the torque transfer arrangement 52 to the second output shaft 104 thereby causing rotation of the second output shaft 104 and the first wheel 106.

Figure 4:
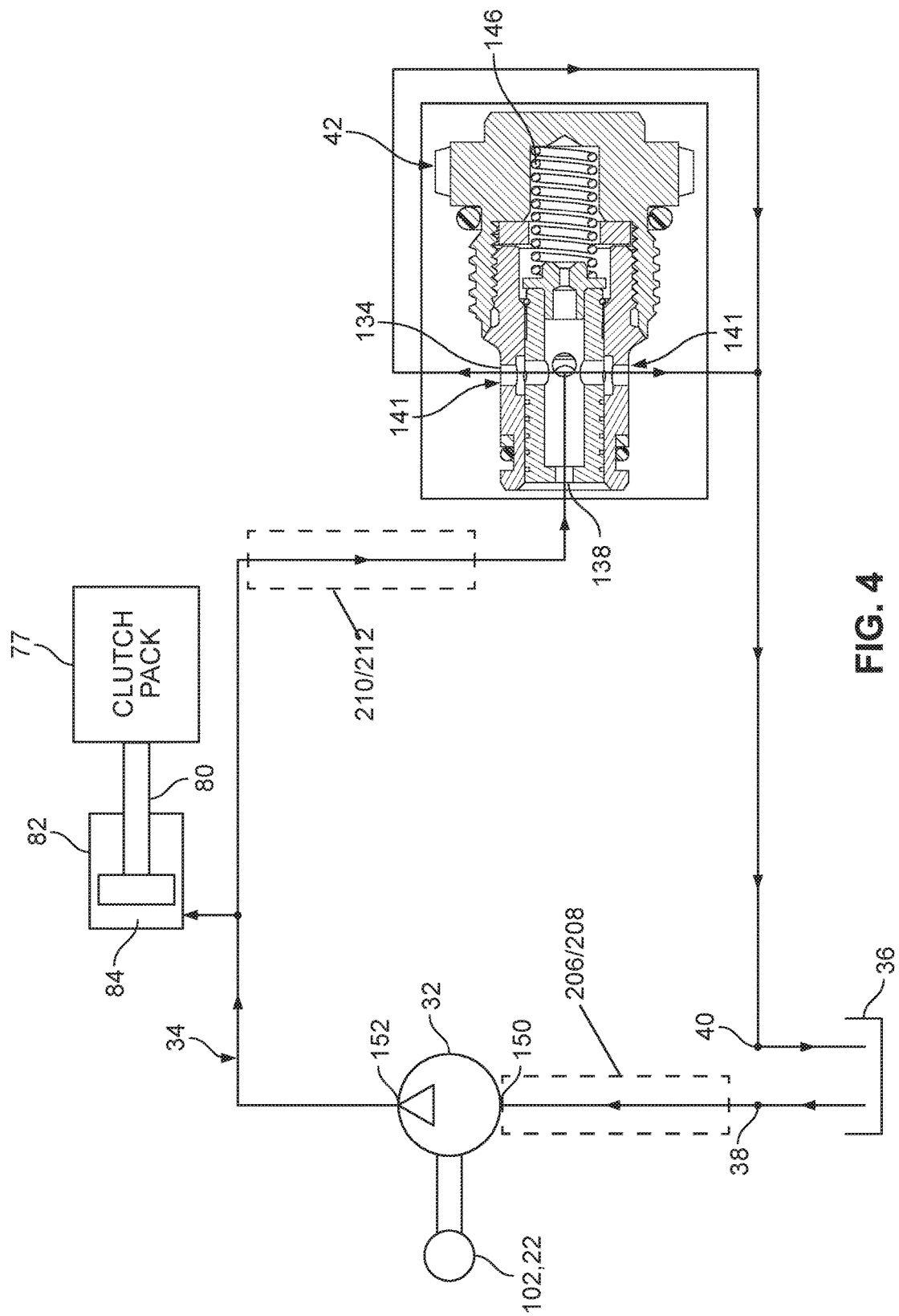
FIG. 4 schematically depicts a hydraulic actuation circuit of the limited-slip driveline apparatus incorporated into the differential of FIG. 1.
Figure 6:
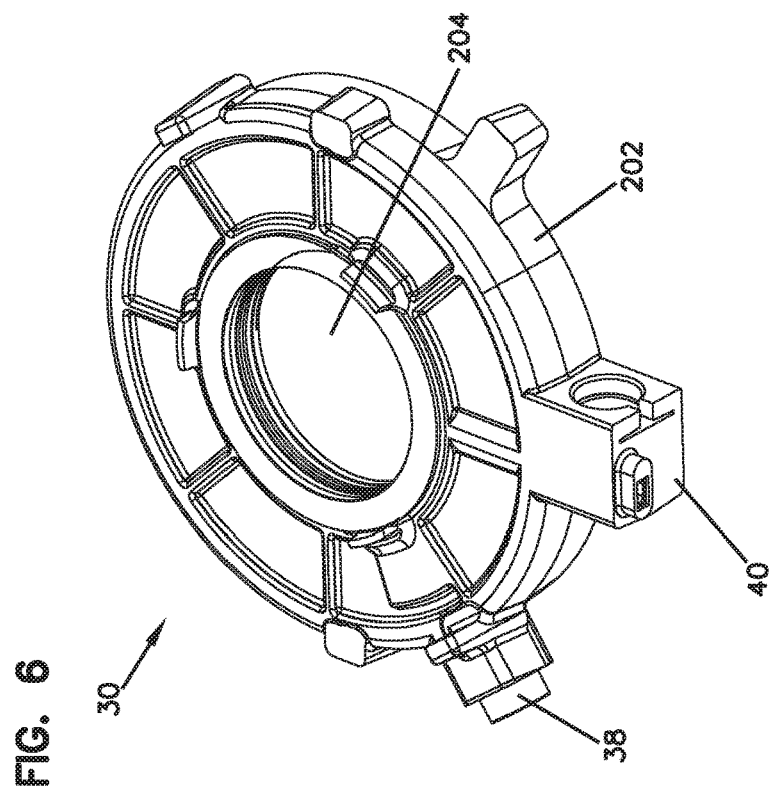
FIG. 6 is a top perspective view of the plenum housing body shown in FIG. 5.
Figure 5:
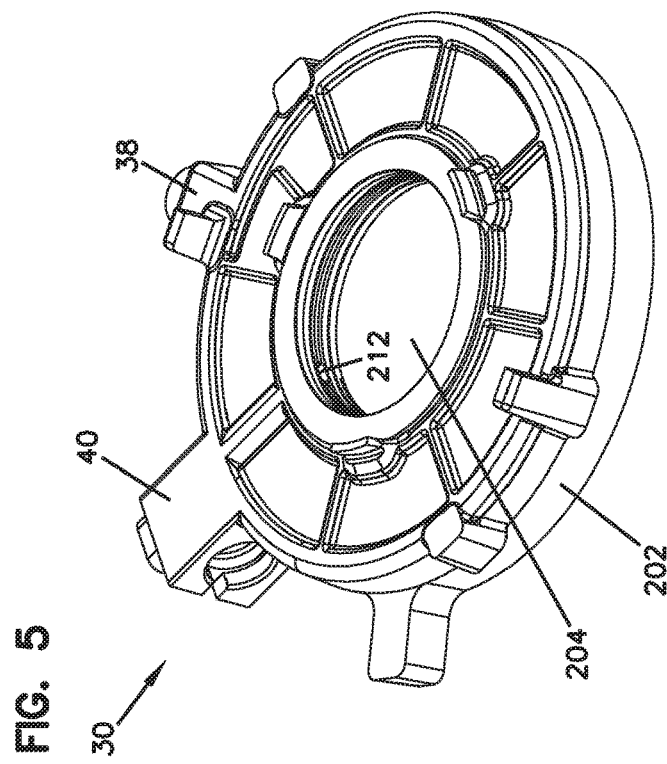
FIG. 5 is a top perspective view of a plenum housing body of the differential shown in FIG. 1.
Figure 7:
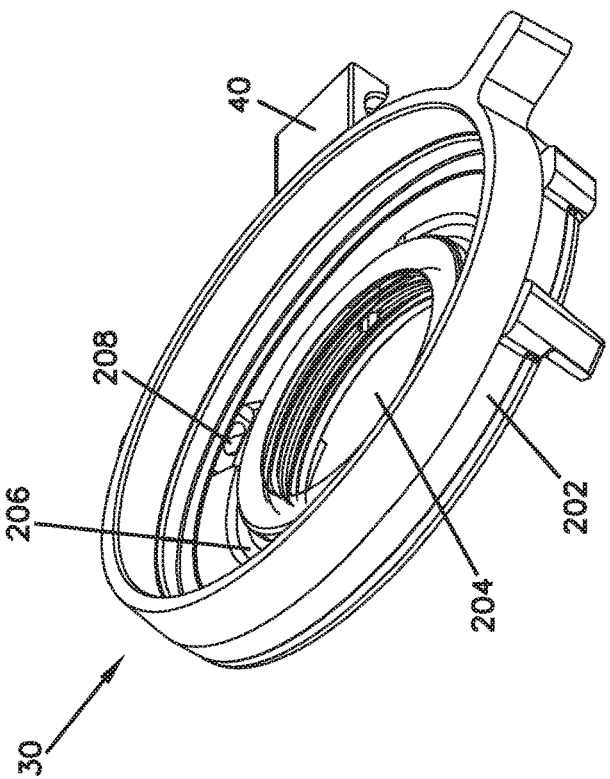
FIG. 7 is a bottom perspective view of the plenum housing body shown in FIG. 5.
Figure 8:
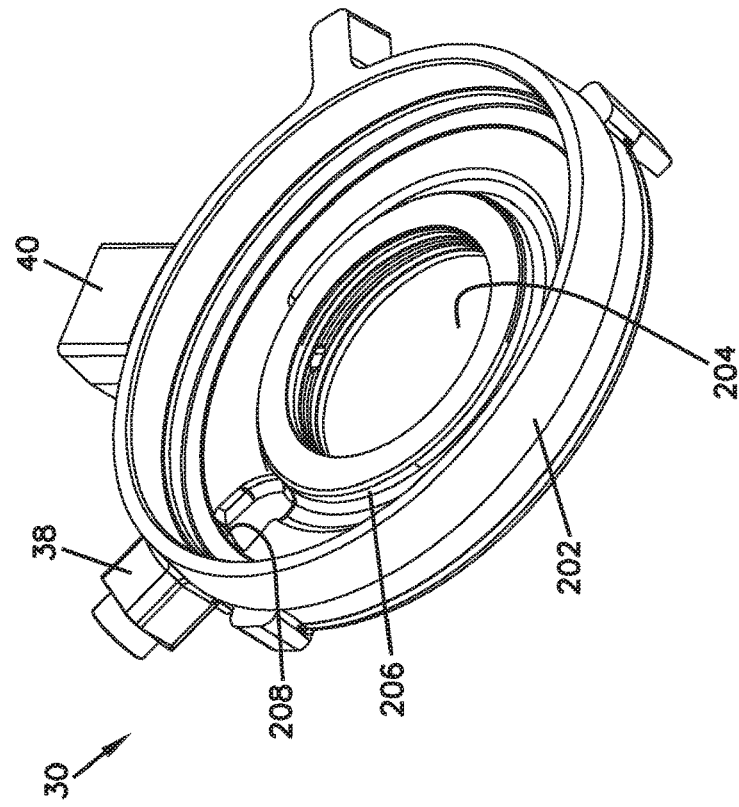
FIG. 8 is a bottom perspective view of the plenum housing body shown in FIG. 5.
Figure 10:
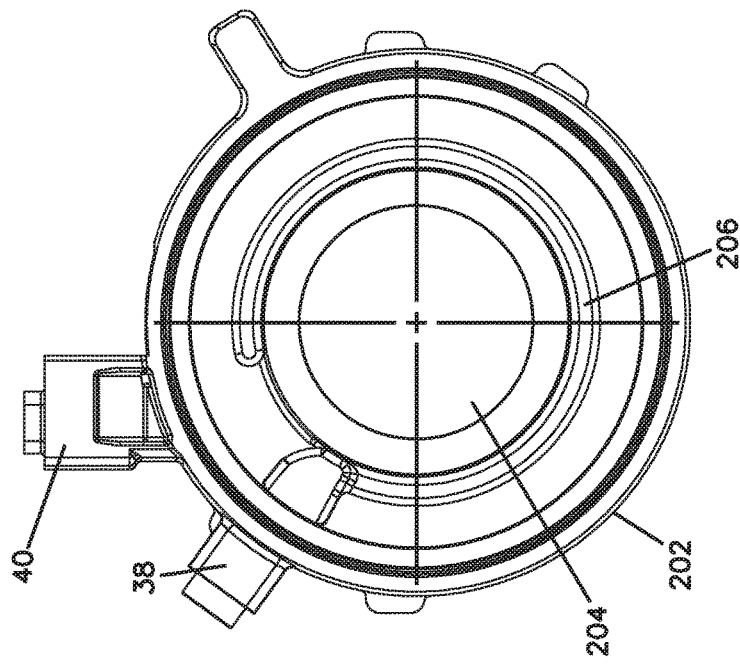
FIG. 10 is a bottom view of the plenum housing body shown in FIG. 5.
Figure 9:
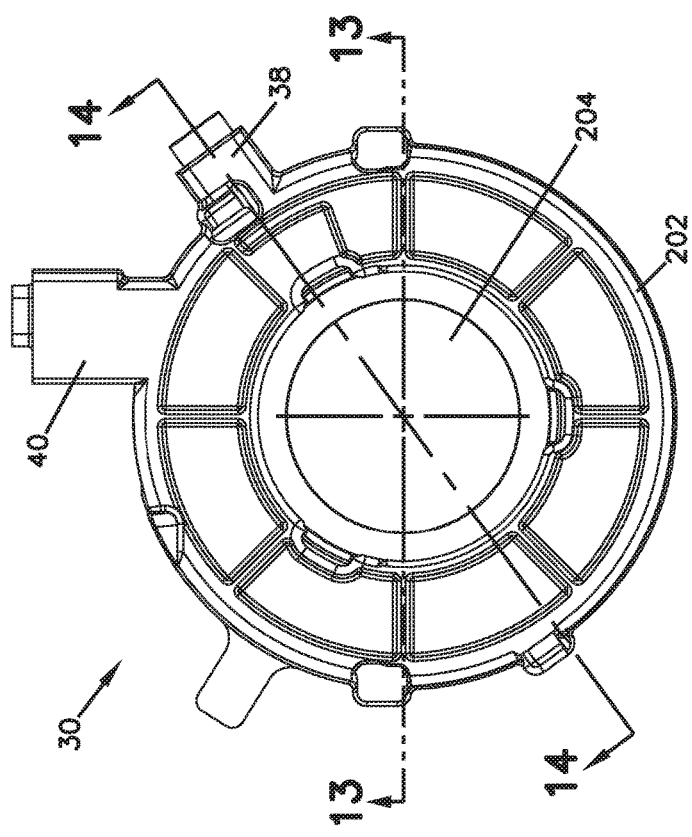
FIG. 9 is a top view of the plenum housing body shown in FIG. 5.
Figure 11:
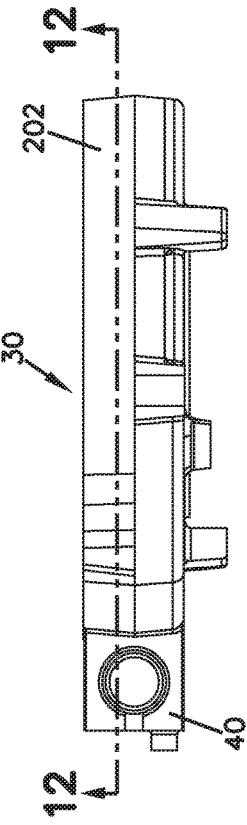
FIG. 11 is a side view of the plenum housing body shown in FIG. 5.

Referring to FIG. 4, when the flow regulating valve 42 is mounted within the valve mounting opening 41 of the plenum housing 30, the inlet port 138 is placed in fluid communication with the pressure chamber 84 and the variable size outlet orifice 141 is placed in fluid communication with the outlet port 40. The hydraulic actuation circuit 34 of the actuator arrangement extends from the reservoir 36 through the input port 38 of the plenum housing 30 to an inlet 150 of the hydraulic fluid pump 32. The hydraulic circuit 34 then passes through the hydraulic fluid pump 32 to an outlet 152 of the hydraulic fluid pump 32. From the outlet 152 of the hydraulic fluid pump 32, the hydraulic circuit 34 extends to the pressure chamber 84. From the pressure chamber 84, the hydraulic circuit 34 extends back through the differential housing 22 and the plenum housing 30 to the inlet opening 138 of the flow regulating valve 42. From the inlet opening 138 the hydraulic circuit 34 extends through the valve 42 to the outlet orifice 141. The hydraulic circuit 134 then extends from the outlet orifice 141 to the output port 40 back to the reservoir 36.

When the first and second output shafts 102, 104 mounted within the differential 22 are caused to rotate at different rates about the rotation axis 24, relative rotation is generated between the first output shaft 102 and the differential housing 22. This relative rotation generates relative rotation between the sleeve 96 and the inner gear 90 of the hydraulic fluid pump 32 thereby causing the hydraulic fluid pump 32 to draw hydraulic fluid from the reservoir 36 through the input port 38 and into the inlet 150 of the hydraulic fluid pump 32. The hydraulic fluid then flows through the hydraulic fluid pump 32 and is discharged from the outlet 152 of the hydraulic fluid pump 32 toward the pressure chamber 84. The fluid flow within the hydraulic circuit 34 flow then proceeds from the pressure chamber 84 to the flow regulating valve 42. The flow enters the flow regulating valve 42 through the inlet port 38 and exits through the outlet orifice 141. As long as the flow rate is below the set maximum flow rate of the flow regulating valve 42, the spring 146 retains the flow regulating valve 42 in the full open position and flow proceeds unregulated through the outlet orifice 141 and back to the reservoir 36 through the outlet port 40. In this situation, the hydraulic pressure upstream of the flow regulating valve 42 (i.e., the hydraulic pressure provided at the pressure chamber 84) is sufficiently low that no meaningful actuation of the clutch 70 occurs.

It will be appreciated that the flow rate generated by the hydraulic fluid pump 32 is directly related (e.g., directly proportional) to the relative rotational speed between the first output shaft 102 and the differential housing 22. Thus, as the relative rotational speed between the first output shaft 102 and the differential housing 22 increases, the flow rate generated by the hydraulic fluid pump 32 increases accordingly until the flow rate reaches the set maximum flow rate of the valve 42. When the flow rate generated by the hydraulic fluid pump 32 reaches the set maximum flow rate of the flow regulating valve 42, the flow regulating valve 42 begins to regulate flow by varying the size of the orifice 141 so that the flow passing through the flow regulating valve 42 does not exceed the set maximum flow rate regardless of the pressure within the circuit 34.

When the flow regulating valve 42 regulates flow by restricting the outlet orifice 141, the hydraulic pressure within the hydraulic actuating circuit 34 upstream of the valve 42 increases thereby increasing the force supplied by the piston 90 to the clutch pack 77 to a level where meaningful actuation/braking occurs. In this way, the increased hydraulic pressure provides an increased breaking action that prevents the relative rotational speed between the first output shaft 102 and the differential housing 22 from exceeding a predetermined value corresponding to the set maximum flow rate of the flow regulating valve 42. In one example embodiment, the set maximum flow rate passing through the flow regulating valve 42 equals 0.25 gallons per minute and the maximum relative rotational speed between the first output shaft 102 and the differential housing 22 is 60 rotations per minute.

Plenum Housing Body 30

Referring to FIGS. 5-14, the plenum housing body 30 is shown in greater detail. The plenum 30 of the present teachings includes ornamental features beyond the technical and functional features disclosed herein. For example, U.S. patent application Ser. No. 29/530,633 discloses a design for a composite plenum. The entirety of U.S. Ser. No. 29/530, 633 is incorporated by reference herein. As discussed previously, the plenum housing body 30 has a low pressure inlet 38 and a high pressure outlet 40, wherein the high pressure outlet is configured to receive the regulating valve 42. The plenum housing body 30 defines an outer perimeter 202 at which the inlet 38 and outlet 40 are located and further defines a central aperture 204.

In one aspect, the plenum housing body 30 defines a fluid inlet channel 206 that is in fluid communication with the low pressure inlet 38 via a first internal port 208. Once the plenum housing body 30 is assembled onto the differential, the fluid inlet channel 206 is in fluid communication with low pressure inlet 150 of the pump 32 such that fluid from the reservoir 36 can be drawn into the pump 32 through the port 208 and channel 206.

In one aspect, the plenum housing body 30 defines a fluid outlet channel 210 that is in fluid communication with the high pressure outlet 40 via a second internal port 212. Once the plenum housing body 30 is assembled onto the differential, the fluid outlet channel 210 is in fluid communication with the outlet 152 of the pump 32 such that fluid from the pump 32 can be delivered to the valve 42 through the port 212 and channel 210.

In one aspect, the fluid outlet channel 210 is formed between a first seal groove 214 and a second seal groove 216, wherein the first seal groove 214 is defined between a first wall 214a and a second wall 214b and the second seal groove 216 is defined between a third wall 216a and a fourth wall 216b. The seal grooves 214, 216 receive seals 33a and 33b to allow the fluid outlet channel 210 to be sealed against a surface of the rotating first housing piece 22A. As shown, the fluid outlet channel 210 is defined between the second and third walls 214b, 216a which are joined together at a root portion or wall 218.

The root portion 218 is provided with a radius or curved shape such to reduce stress at this area of the plenum housing body 30. An analysis conducted by the inventors showed that the predicted failure mode for a composite plenum housing would be fatigue cracking at the root of the inner and outer seal grooves 214, 216—a result of the cantilevering effect of the deflected seal groove. The analysis showed that the maximum stress could be decreased by half and deflection reduced by more than 60% by reducing the depth of the seal grooves by 50 percent (over a standard aluminum housing seal groove depth) and increasing the radius of the root portion 218 from 0.4 millimeters to 0.8 millimeters. Adding wall thickness at the area of the root portion 218 has also been shown to reduce stress in this area (e.g. increase wall thickness by 0.5 mm over that found in a corresponding aluminum plenum housing). The combination of these combined design features has been shown to increase the estimated fatigue cycles (at 140° C.) by a factor of about 8 over a non-optimized composite plenum housing.

The second internal port 212 is provided with an ovular or racetrack shaped cross-section to further reduce stress by eliminating sharp corners in the design. As shown, the second internal port 212 extends into the second and third walls 214b, 216a, thereby allowing for increased flow between the channel 210 and the outlet 40. This design enables enough flow such that only a single internal port 212 is necessary. However, additional internal ports may be provided, if desired.

In one aspect, the plenum housing body 30 can be produced as a net-shape fiber reinforced plastic material including chopped fibers and an epoxy resin. By use of the term "net-shape" it is meant that the part is essentially finished coming out of the mold and does not require significant machining or other processing after the molding process is complete. In one aspect, the disclosed design of the plenum housing body 30 is optimized for injection molding to have the same performance as a typical aluminum version. Material selection was based on stresses identified in an original aluminum finite element analysis and by using material specifications at 150° C. (423.15 K) (application temperature). As a result of the analysis, it was determined that a material composition with sufficient strength and tensile modulus at 150° C. (423.15 K) was a composition including 60 percent by weight chopped high temperature nylon glass fibers and 40% epoxy resin. In addition to meeting application requirement for strength and stiffness, this percentage of fibers also contributes to a reduction in overall part shrinkage and warpage.

Orientation of the fibers within the plenum housing body 30 can also have a major influence on the overall strength and fatigue resistance of the component. There are several approaches that can be taken to account for fiber orientation, for example, finite element and mold analysis can be run using material properties given in the data sheet for 100% alignment (longitudinal) and run using 30% of the given material properties. This 30% "knock-down" in properties was selected to represent the non-aligned state or transverse orientation in which the matrix (e.g. epoxy) is loaded instead of the fibers. Based on mold flow outputs, fiber orientation in a specific area can be predicted and properties can be assigned (either longitudinal, transverse or the mean of the two to represent random orientation).

Figure 17:
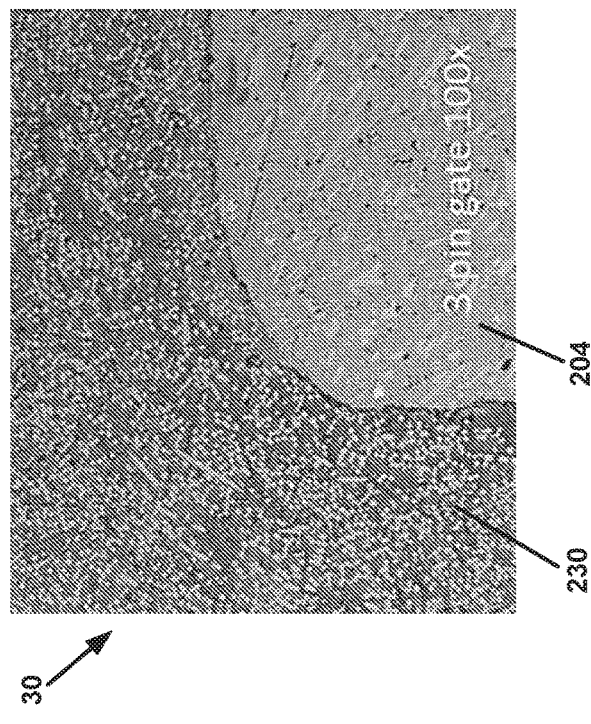
FIG. 17 is a photographic view showing actual fiber orientation resulting from the first molding process.
Figure 15:
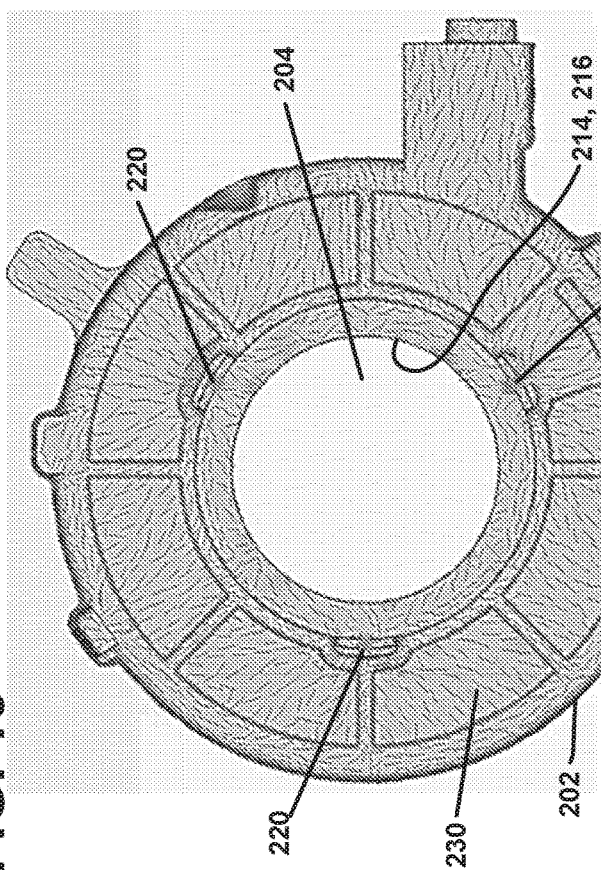
FIG. 15 is a schematic of the plenum housing body shown in FIG. 5 showing predicted fiber orientation from a first molding process.
Figure 16:
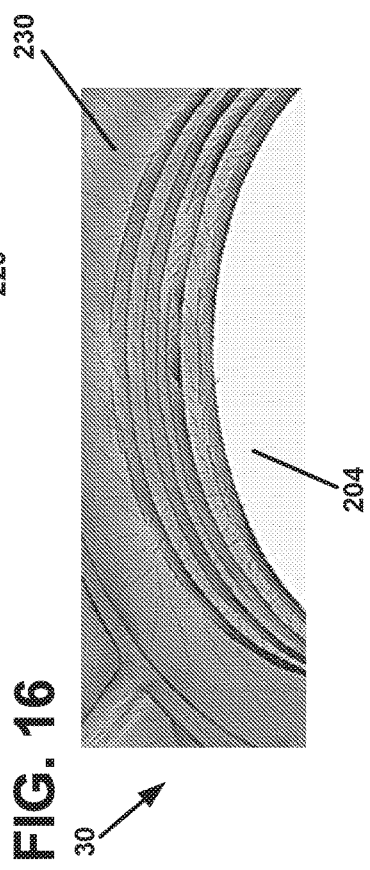
FIG. 16 is an enlarged perspective view of the schematic of the plenum housing body shown in FIG. 15.

One goal of the design is to maximize the loading of the fibers (strength phase) at high stress areas which can be done by matching FEA results of high stress areas with fibers aligned longitudinally to the stresses. Referring to FIGS. 15 and 16, simulated results of mold flow analysis of 3-gate design are shown in which the gates 220 are located more proximate the central aperture 204 than they are to the outer perimeter 202. The orientation of the fibers 230 shown in FIGS. 15 and 16 is in the transverse direction in the area of the seal grooves 214, 216. Although the gating system shown in FIGS. 14 and 15 is sufficient to form a composite part, this approach can result in fibers oriented in the transverse direction, as shown in FIGS. 15 and 16. The 100× photograph provided at FIG. 17 shows this condition, where it can be seen that the predominant orientation is in the transverse direction (into the page). This condition can reduce the material's fatigue properties by up to 40% over the more preferred, longitudinal direction. This unfavorable stress loading was not sufficient to meet the targeted cycles to failure.

Figure 20:
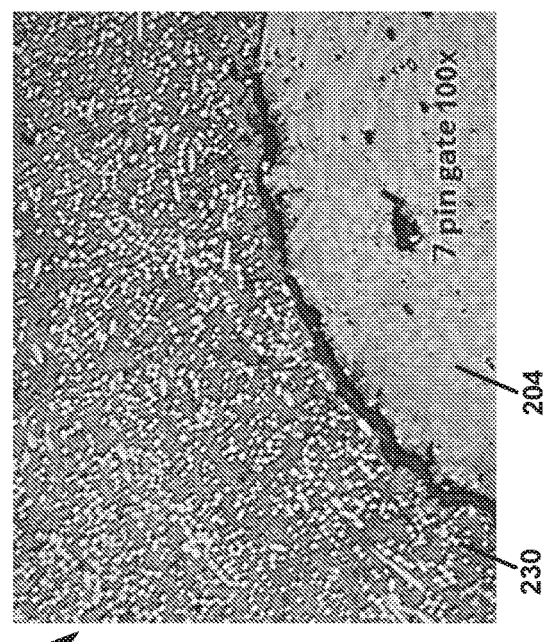
FIG. 20 is a photographic view showing actual fiber orientation resulting from the second molding process.
Figure 18:
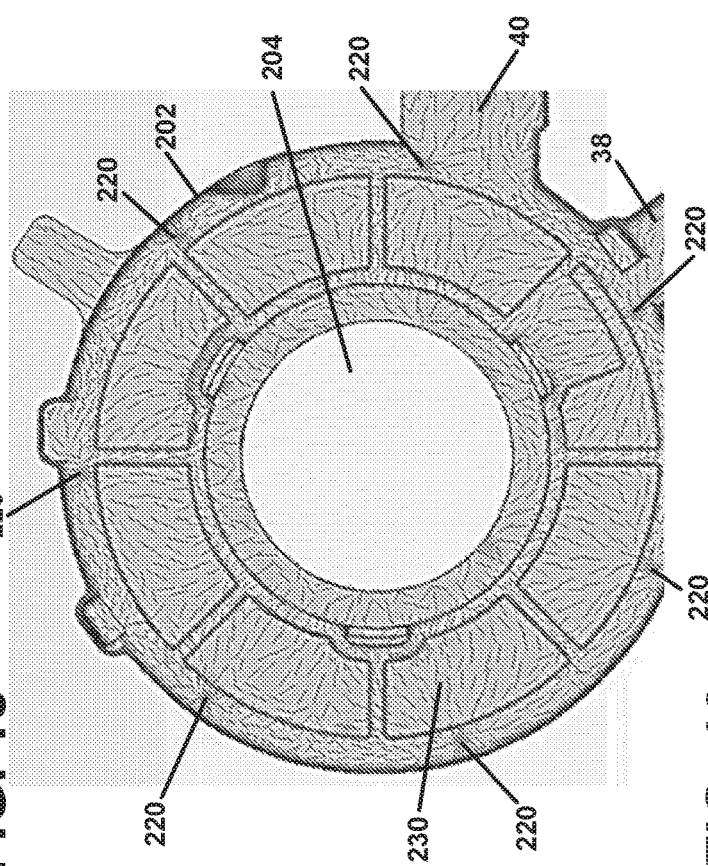
FIG. 18 is a schematic of the plenum housing body shown in FIG. 5 showing predicted fiber orientation from a second molding process.
Figure 19:
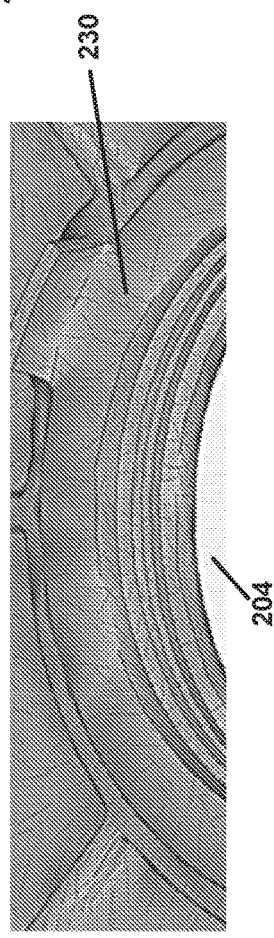
FIG. 19 is an enlarged perspective view of the schematic of the plenum housing body shown in FIG. 18.

Referring to FIGS. 18-20, an optimized gating and molding approach is shown in which seven gates 220 are provided that are located more proximate the outer perimeter 202 than to the central aperture 204. This configuration results in a more random configuration at the high stress regions (some combination of aligned and unaligned fiber orientation) as evidenced by the 100× photograph provided at FIG. 20. Through analysis, it was determined that the optimal gate configuration included a three pin gate system arranged around the part outer perimeter 202. This gate design provides a more random orientation along the seal grooves 214, 216 which results in a fatigue life prediction that met the application requirements. Additionally, the negative effects of warpage and flatness due to the gate relocation are considered minimal, compared to the three gate configuration.

By increasing the number of pin gates the number of material flow fronts is also increased. Mold flow analysis was again used to evaluate the location and temperature of the knit lines. Knit lines occur when two flow fronts meet; with both flow fronts rapidly cooling there is less intermingling of the resin and fiber. The result is a lower strength area. In the disclosed design, the gates 220 are located such that the location of the knit lines avoids the internal port 212 from the valve 42, a region with minimal wall thickness and such that the knit lines formed are at temperatures that would still allow for some co-mingling of fronts which would minimize strength reduction.

As the disclosed plenum housing body 30 requires extended exposure to synthetic gear oil at elevated temperature, a material evaluation was undertaken on a coupon level. The chemical resistance testing was performed at elevated temperatures (exceeding the application temperatures as a method to accelerate testing) for 500 hours to verify dimensional stability and resistance to absorption of environmental and working fluids. Tensile coupons of the material were used for this testing. Fluids tested were typical synthetic gear oils that would be used in the eLSD application. Tensile testing was done on tensile samples untested as a baseline. Each coupon was measured before and after soak to evaluate dimensional stability. Coupons were soaked at 100° C. (373.15 K) and 120° C. (393.15 K) for 100 hours and 500 hours. Dimensional change at maximum conditions (120° C./500 hours) was negligible. Material strength was 98% retained after maximum testing conditions. The conclusion of the chemical resistance testing was that the selected materials was resistant to the relevant fluids and exhibited little to negligible change after ageing.

When forming the disclosed plenum housing body 30, collapsible cores and removable pins may be utilized to aid in forming the cavity areas. For example, collapsible cores can be used to form the seal grooves 214, 216 and/or outlet channel 210. The internal ports 208 and 212 can be formed around a pin that is removed after the molding process. The resulting opening in the outer perimeter 202 of the body 30 can be sealed by heat staking or by another process, such as the insertion of a plug.

The disclosed plenum housing body 30 has been shown through modelling and testing to have a fatigue performance sufficient to meet the application performance and life requirements, according to the component durability requirements. Simultaneously, the disclosed plenum body housing 30 yields a 30% weight savings over a standard aluminum component while maintaining the same durability/life as the base aluminum version.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What is claimed is:

1. A plenum housing body for a differential assembly having a pump, the plenum housing body comprising:
   a. a low pressure inlet;
   b. a high pressure outlet configured to receive a control valve;
   c. a fluid inlet channel in fluid communication with the low pressure inlet via a first internal port and being configured to be in fluid communication with an inlet side of the pump when the plenum housing body is assembled onto the differential assembly; and
   d. a fluid outlet channel in fluid communication with the high pressure outlet via a second internal port and being configured to be in fluid communication with an outlet side of the pump when the plenum housing body is assembled onto the differential assembly;
   e. wherein the plenum housing body is formed as a net-shape fiber reinforced plastic material including chopped fibers and an epoxy resin.

2. The plenum housing body of claim 1, wherein the plenum housing body defines a central aperture having inwardly facing radial first and second seal grooves for receiving seal members, the first seal groove being defined between a first wall and a second wall and the second seal groove being defined between a third wall and a fourth wall, wherein the fluid outlet channel is disposed between the first and second seal grooves and is defined between the second and third walls joined by a fifth wall having a first radius.

3. The plenum housing body of claim 2, wherein the first radius is about 8 millimeters.

4. The plenum housing body of claim 1, wherein the second outlet port has a racetrack shaped cross-section.

5. The plenum housing body of claim 2, wherein the chopped fibers proximate the first and second seal grooves and the fluid outlet channel are aligned generally parallel to the first through fourth walls to a greater degree than the chopped fibers are aligned generally orthogonal to the first through fourth walls.

6. The plenum housing body of claim 2, wherein the plenum housing body defines an outer perimeter and wherein the plenum housing body includes mold gate vestiges that are closer in proximity to the outer perimeter than to the central aperture.

7. The plenum housing body of claim 6, wherein the plenum housing body includes seven mold gate vestiges.

8. The plenum housing body of claim 2, wherein the plenum housing body includes molded knit lines that are non-intersecting with the first and second internal ports.

9. The plenum housing body of claim 1, wherein the chopped fibers are chopped fiberglass fibers.

10. The plenum housing body of claim 9, wherein the fiber reinforced plastic material includes about 60 percent by weight chopped fiberglass fibers and about 40 percent by weight epoxy resin.

11. A method for making a plenum housing body for a differential assembly having a pump, the method comprising:
    a. providing a mold cavity defining a central aperture of the plenum housing body and an outer perimeter of the plenum housing body; and
    b. injecting a fiber reinforced plastic material including chopped fibers and an epoxy resin into the mold cavity through a plurality of gates that are located closer in proximity to the outer perimeter than to the central aperture.

12. The method for making the plenum housing body of claim 11, wherein the step of injecting includes injecting the fiber reinforced plastic material through seven gates.

13. The method for making the plenum housing body of claim 11, wherein the step of injecting includes injecting the fiber reinforced plastic material through the gates such that knit lines formed between the gates are non-intersecting with first and second internal ports defined in the plenum housing body.

14. The method for making the plenum housing body of claim 11, wherein the step of injecting a fiber reinforced plastic material includes injecting chopped fibers that are chopped fiberglass fibers.

15. The method for making the plenum housing body of claim 14, wherein the step of injecting a fiber reinforced plastic material includes injecting a material that is about 60 percent by weight chopped fiberglass fibers and about 40 percent by weight epoxy resin.

16. The method for making the plenum housing body of claim 11, further including the step of providing one or more collapsible cores to define seal grooves at the central aperture.

17. The method for making the plenum housing body of claim 16, further including the step of providing one or more removable pins to define internal ports within the plenum housing body.

18. The method for making the plenum housing body of claim 17, further including the step of removing the one or more removable pins after the plastic material has cured.

19. The method for making the plenum housing body of claim 18, further including the step of sealing one or more openings created by removing the one or more removable pins by heat-staking the one or more openings.

* * * * *